United States Patent [19]
Driscoll et al.

[11] Patent Number: 5,089,947
[45] Date of Patent: Feb. 18, 1992

[54] POWER SUPPLY CIRCUIT FEATURING MINIMUM PARTS COUNT

[75] Inventors: Carleton D. Driscoll, Cary; Ronald S. Jungling, Raleigh; Elie M. Najm, Cary, all of N.C.

[73] Assignee: International Business Machines Corporation, Armonk, N.Y.

[21] Appl. No.: 546,209

[22] Filed: Jun. 29, 1990

[51] Int. Cl.⁵ .................................... H02M 3/335
[52] U.S. Cl. ................................. 363/20; 363/21; 363/49; 315/411; 358/190
[58] Field of Search ................ 358/190; 331/149; 363/19, 20, 18, 49, 21; 315/411

[56] References Cited

U.S. PATENT DOCUMENTS

| | | | |
|---|---|---|---|
| 4,467,406 | 8/1984 | Hattori et al. | 363/19 |
| 4,745,535 | 5/1988 | Sugishima et al. | 363/19 |
| 4,812,959 | 3/1989 | Driscoll et al. | 363/20 |

Primary Examiner—Steven L. Stephan
Assistant Examiner—Todd Voeltz
Attorney, Agent, or Firm—Joscelyn G. Cockburn

[57] ABSTRACT

A full reset flyback regulator includes a power transformer having a primary winding and at least one secondary winding coupled to a load. A single control winding on a primary side of the power transformer is coupled through control circuitry to a gate electrode of a switching device that is connected to the primary winding. The voltage polarity on the control winding alternates so that if the switching device is "ON" a drive voltage is provided on its gate electrode and if the switching device is "OFF" a bias voltage is provided to the error amplifier control circuit. Each cycle of the regulator is initiated via a sync pulse which is provided from the high voltage flyback transformer of a display or monitor subsystem.

10 Claims, 1 Drawing Sheet

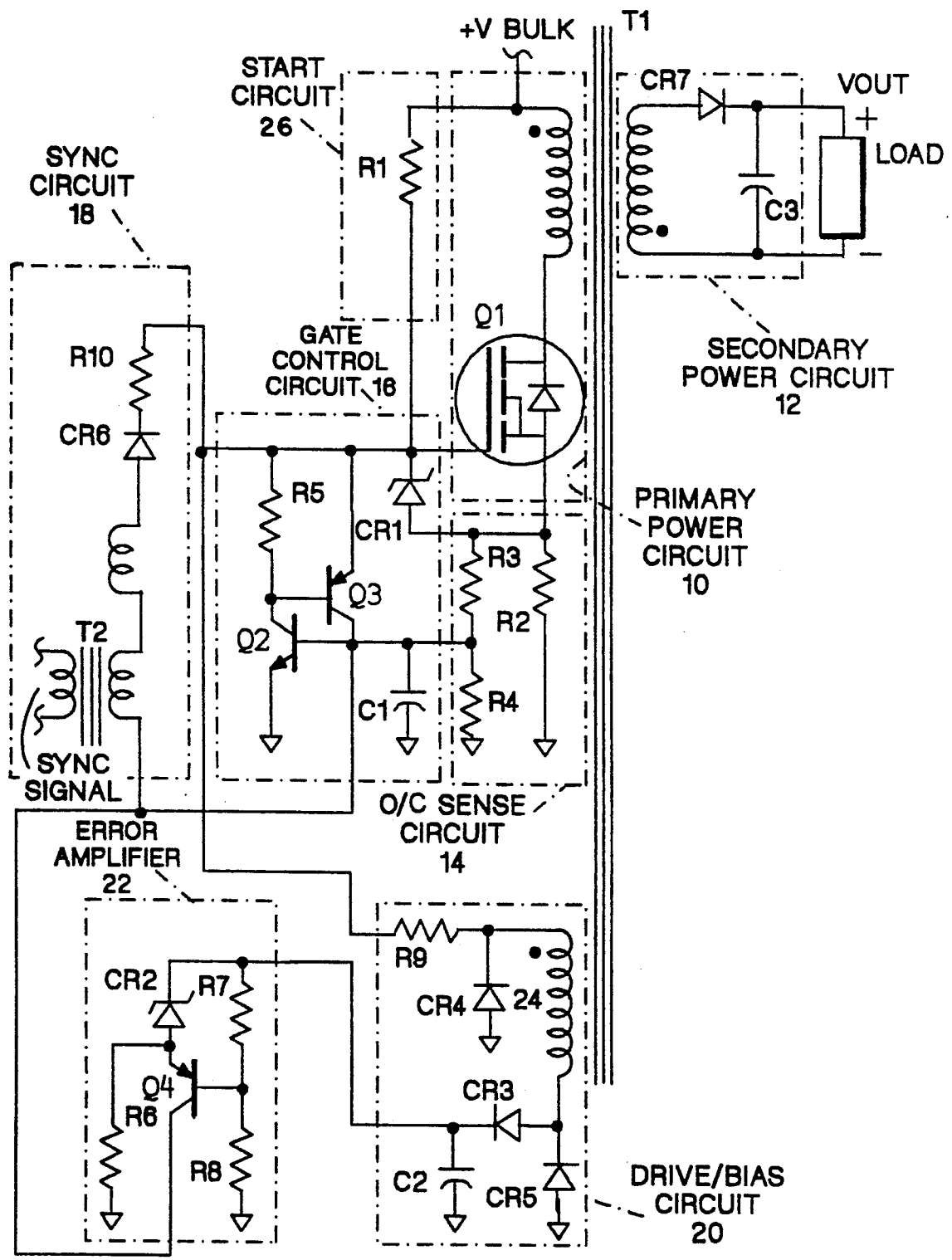

POWER SUPPLY CIRCUIT FEATURING MINIMUM PARTS COUNT

BACKGROUND OF THE INVENTION

1. FIELD OF THE INVENTION

The present invention relates to an improved power supply for providing power to display devices.

2. Prior Art

The use of power supplies as energy sources for monitors, computers and other types of electrical devices is well known in the prior art. Power supplies can be classified based upon their topologies. Among the various types of topologies, the flyback or blocking oscillator topology is widely used for low power applications. The topology is popular because it is relatively simple, requires few components, provides multiple regulated outputs from a single supply, etc.

U.S. Pat. No. 4,812,959 describes a blocking oscillator type power supply. The power supply is synchronized to run at the frequency of a display monitor. When synchronized, the power supply operates as a fully reset fixed frequency flyback converter. The power supply includes a drive winding, on the primary side of its power transformer, that provides drive signals to the base electrode of the switching transistor. A feedback loop with a control circuit interconnects the secondary side of the power transformer to the primary side. The feedback loop and control circuit regulate the output voltage of the power supply.

U.S. Pat. Nos. 4,467,406 and 4,745,535 describe ringing choke-type DC/DC converters in which a flyback winding on the primary side of the power transformer is used to control the output voltage on the secondary side of the transformer.

Even though the described prior art power supplies work well for their intended purposes, they have inherent deficiencies which make them inappropriate for use on certain types of devices. There are several areas, such as the consumer electronic industry, that are highly competitive and sub-assemblies, including power supplies, must be low-cost and very reliable. In addition, most electronic devices, such as monitors, is packaged in relatively small frames and space for sub-assemblies are very limited. Finally, most consumer electronic devices are high volume and, therefore, it is desirable to provide sub-assemblies which can be easily manufactured.

SUMMARY OF THE INVENTION

It is therefore a general object of the present invention to provide an improved power supply for driving a CRT display subsystem.

It is another object to provide a power supply which overcomes the above-identified prior art deficiencies.

The prior art deficiences are overcome by a power supply which is fabricated from a minimum number of components. The low component count is achieved by using a single component and/or group of components to provide multiple functions. In particular, the sync pulses which initiate an operating cycle of the power supply are generated from the high voltage transformer of the CRT display subsystem. Similarly, a single control winding on the primary side of the power supply provides both drive and bias voltages.

The power supply includes a transformer having a primary winding, a secondary winding and a control winding. The secondary winding is coupled through a rectifying circuit to a load. The primary winding has an input end coupled to an unregulated DC voltage source and an output end connected to an FET device. The gate electrode of the FET device is coupled through a circuit arrangement to the high voltage deflection system of the monitor. The high voltage deflection system provides anode voltages for driving the CRT. The circuit arrangement includes a winding which generates a pulse that initiates an operating cycle of the FET device. The ON/OFF period of the FET device is controlled by a latching circuit means connected to the gate electrode of the FET. The latching circuit means is responsive to signals outputted from an overcurrent (O/C) sense circuit connected to the source electrode of the FET or signals outputted from an error amplifier circuit arrangement which monitors the control winding.

The foregoing and other features and advantages of this invention will be more fully described in the accompanying drawings.

BRIEF DESCRIPTION OF THE DRAWINGS

The sole FIGURE shows a schematic of the power system according to the teachings of the present invention.

DETAILED DESCRIPTION OF THE PREFERRED EMBODIMENT

The sole FIGURE shows a circuit schematic of the minimum parts count power supply according to the teachings of the present invention. The power supply comprises primary power circuit 10, secondary power circuit 12, start circuit 26, over/current (O/C) circuit 14, gate control circuit 16, sync circuit 18, drive/bias circuit 20, and error amplifier 22.

OVERVIEW

Each switching cycle of the power supply is begun by a sync pulse, except during startup. Operation during startup is described later. The switching cycle consists of three parts: the on time of Q1, the transformer reset time and the dead time. First, energy is stored while Q1 is on. Then Q1 is turned off and the transformer delivers its stored energy to the secondary load. After all the energy has been delivered and the power transformer is fully reset, there is a dead time when nothing happens. This is to guarantee that the transformer will always have time to reset. The dead time ends with the arrival of the next sync pulse, which starts a new cycle.

CIRCUIT OPERATION

The primary power circuit 10 includes transformer T1 and power FET Q1. The power transformer is the basic energy storage element of the power supply. The power FET is a high frequency switching device that connects the transformer primary to the bulk voltage (Vbulk). Vbulk is an unregulated DC voltage which is not isolated from the AC power line. Vbulk is generated by rectifying the filtering the power line voltage. The rectifying and filtering of an AC voltage to generate a DC voltage is standard practice in the power supply technology and a detailed description of such a circuit will not be given. The transformer T1 serves as an energy storage element. It stores energy when Q1 is on and delivers it to the secondary load when Q1 is off. The secondary load would be the monitor that the present power supply drives. The polarities of the transformer windings are such that with Q1 on, current flows in the primary and drive/bias windings (details of this winding will be given subsequently) but not in the secondary winding. When Q1 turns off, the polarity of the transformer winding voltage is reversed and energy is transferred to the secondary winding.

The secondary power circuit consists of rectifier CR7 and output filter capacitor C3. The rectifier and filter capacitor convert the voltage on the secondary winding to DC voltage that can be used to drive the load. It should be noted that the voltage Vout which the load sees is not directly controlled. Instead, the drive/bias circuit 20 generates a flyback voltage which is regulated. The flyback voltage establishes the volts per turn for the transformer which results in regulation of the secondary voltage. The primary sense approach is very cost-effective since only one device (the power transformer) must meet the primary to secondary isolation requirements. Also, no pulse transformers or optoisolators are needed to convey Vout to the primary side for regulation.

Still referring to the sole FIGURE, the drive/bias circuit 20 provides drive signal for FET Q1 and bias signal. The drive/bias circuit includes C2, CR3, CR4, CR5, R9 and control winding 24 on the power transformer T1. The circuit provides the drive voltage for Q1 and also the bias voltage on C2. The drive voltage is needed during the on time of Q1. The bias voltage for C2 is needed during the off time of Q1. The diodes CR3, CR4 and CR5 make it possible to use a single transformer winding for both purposes. When Q1 is on, the polarity of the drive/bias winding is such that CR5 conducts and a drive signal is provided to the gate of Q1. When Q1 turns off, the polarity of the drive/bias winding reverses. Capacitor C2 now charges through CR3 and CR4 with CR5 reverse biased. The drive for Q1 is cut off while CR4 conducts. The effect on C2 is the same as if there were a dedicated bias winding. During startup, CR5 prevents current from the start resistor R1 from flowing through the drive bias winding to the bulk return. This minimizes the current that R1 must supply and reduces power dissipation. Current can still flow through the drive/bias winding and CR3 into the error amplifier 22. The input impedance of this circuit must be considered when selecting R1. It is generally possible to design the error amplifier with a high input impedance so as to minimize the current that must be supplied by R1.

Still referring to the sole FIGURE, the gate control circuit 16 is comprised of C1, CR1, Q2, Q3 and R5. Its function is to turn off the power FET Q1 and keep it off until it is time to start the next cycle. As will be described subsequently, the cycle is started by the sync pulse from sync circuit 18. The gate control circuit operates in response to the output current from the error amplifier or to an overcurrent condition in Q1. Overcurrent is detected by overcurrent sense circuit 14 (to be described subsequently). The gate control circuit works as follows: the voltage across C1 must build up to the threshold level of Q2 in order for the circuit to be activated. C1 is charged either by the current from Q4 in the error amplifier or by the input from the overcurrent sense circuit. The on time of Q1 is determined by how long it takes to charge C1. This is the means of regulation for the power supply. If the bias voltage across C2 increases, the current from the error amplifier will also increase. This reduces the charging time of C1 and therefore also reduces the on time of Q1. This means less energy will be delivered to the load and the bias voltage is reduced. Conversely, if the bias voltage decreases, the charging time of C1 increases. More energy is delivered to the load and the bias voltage is increased. When C1 is charged, Q2 turns on. This causes Q3 to turn on and the two devices act as an SCR; receiving holding current from the drive/bias circuit. R5 is the base to emitter leakage resistor for Q3. Resistor R4 in the overcurrent sense circuit also serves as the leakage resistor for Q2. CR1 protects the gate of Q1 against transient overvoltage.

After Q1 turns off, the drive/bias winding voltage reverses polarity and diode CR4 in the drive/bias circuit conducts. This reverse biases the gate of Q1 and keeps it turned off. This condition continues until all the energy in the transformer has been transferred to the load. This guarantees that Q1 cannot turn on during the reset time of the transformer. When Q1 turns off, the Q2/Q3 SCR can no longer receive holding current from the drive/bias circuit. The start resistor, R1, is chosen so that it does not provide enough holding current to keep the Q2/Q3 SCR in conduction. Q3 now turns off from lack of base current, but Q2 still conducts as a transistor. This is because it continues to receive drive from Q4 in the error amplifier. This guarantees that Q1 will not turn on during the dead time. This is necessary because CR4 in the drive/bias circuit does not conduct during the dead time. The circuit remains in this state until C1 is discharged. There are two ways for this to happen. In normal operation the next sync pulse will turn on Q1 and discharge C1 at the same time. It does this by charging the gate capacitance of Q1 while forcing current into C1 in the opposite direction. Then a new cycle begins. If no sync pulse is present, C1 will eventually discharge into R4. This mode of discharge is important during startup as will be described later.

The error amplifier converts the voltage on C2 into a current and delivers it to gate control circuit 16. The error amplifier includes CR2, Q4, R6, R7 and R8. The input voltage to the error amplifier is the bias voltage generated on C2 from drive/bias winding 24. The error amplifier is a voltage to current converter. CR2 is a zener diode that establishes a reference voltage at the emitter of Q4. R6 establishes the zener current. R7 and R8 constitute a voltage divider. Q4 compares the voltage across R7 with a reference voltage and produces a collector current that is proportional to the difference. This current is an input to the gate control circuit described above.

The sync circuit is made up of CR6, T2 and R10. The sync pulses are generated by the high voltage flyback transformer T2 of the monitor (shown schematically as a load connected to the secondary power circuit 12). T2 is a part of the horizontal deflection system of the monitor and it generates the anode voltage (typically many kilovolts) for a picture tube. T2 is needed to drive the monitor. Sync pulses for the power supply are obtained by winding a single turn of wire around the core of the high voltage transformer assembly T2. This turn is usually not part of the high voltage transformer assembly. It could be added during final assembly of the monitor. In operation, CR6 blocks the negative portion of the voltage generated by T2 and R10 limits the current drawn from T2. A positive sync pulse turns on Q1 and also discharges capacitor C1 which is part of the gate control circuit 16.

A single resistor R1 makes up the start circuit. This is the simplest possible start circuit and it helps achieve the goal of minimum overall parts count. At startup, current flows from the bulk voltage (+ Vbulk) through R1 to the gate of Q1. When the gate voltage reaches its threshold level, Q1 turns on and operation begins. There is only one other possible path for current from R1 and that is through the drive/bias winding 24 and into the error amplifier 22. All other paths contain either a blocking diode or a transistor collector. The start resistor is chosen such that it can supply current to the error amplifier and still be able to drive the gate of Q1.

The overcurrent sense circuit is made up of three resistors, R2, R3 and R4. R2 is very low resistance so that almost all of the current from Q1 flows through it. The voltage developed across R2 is divided by R3 and R4 and this becomes the overcurrent input to the gate control circuit 16. If this voltage exceeds the threshold of Q2, the Q2/Q3 SCR will turn on and Q1 will turn off. R3 also limits the current that can flow into the base of Q2 from the current sense resistor and R4 also serves as a base leakage resistor for Q2 in the gate control circuit. The dual use of these components helps to reduce the overall component count of this power supply.

OPERATION DURING STARTUP

At startup, the power supply receives no sync pulses because the monitor circuits are not yet active. Also, the error amplifier 22 is disabled because there is no bias voltage on C2. Operation is initiated by current flow from the start resistor R1. With Q1 on, current in the primary of T1 increases linearly until the overcurrent point is reached. This occurs when C1 is charged to the turn-on threshold voltage of Q2. Q1 then turns off and energy is transferred to the secondary. C1 discharges into R4 until Q2 turns off and a new cycle begins. The power supply continues to operate in current limit mode until the output voltages come up (that is, established at their operating levels). Then the error amplifier and sync circuit become active and normal operation begins.

Several advantages are provided by the above-described improved power supply. Among the advantages are:

The power supply has fewer components than prior art and is, therefore, low-cost. The fully reset flyback topology combined with the new primary control and the synchronization circuitry result in a very cost-effective design.

Minimum size magnetics are required. This is so because the power transformer does not operate below the sync frequency and the smallest possible size transformer can be used.

The power supply occupies minimum PC-card area. This is so because the low parts count and small transformer size save card space. In addition, use of the power FET Q1 makes it possible to implement the primary control and sync circuits without the need for other high power devices.

It should be noted that although the present power supply is well suited for monitor use the concept and the teaching can be easily adapted to other applications.

While the invention has been particularly shown and described with reference to the preferred embodiment thereof, it will be understood that various changes in form and details may be made therein without departing from the spirit and scope of the invention.

I claim:

1. In a display system having a display subsystem and a power subsystem with the power subsystem comprising:
    a blocking oscillator power supply including a power transformer having a primary and a secondary winding for providing current to the display subsystem and a first switching device connect to one end of the primary winding;
    a control circuit arrangement for turning off the switching device coupled to a gate electrode of the switching device;
    a sync circuit arrangement for generating a "Start" pulse coupled to the gate electrode of said switching device;
    a control winding disposed on a primary side of said transformer;
    a first circuit arrangement interconnecting one end of the control winding to the gate electrode;
    a second circuit arrangement interconnecting another end of the control winding to the control circuit arrangement;
    said first and second circuit arrangements coacting so that if a voltage with a first polarity is developed on said control winding the first circuit arrangement allows current to flow into the gate electrode while the second circuit arrangement blocks current flow and if the polarity of the voltage is reversed on said control winding the first circuit arrangement blocks current while the second circuit arrangement allows current to flow into the control circuit arrangement to turn off the first switching device.

2. The power subsystem of claim 1 wherein the sync circuit arrangement includes a sync transformer having primary and secondary coils;
    a unidirectional device connected in series to the secondary coil; and
    a resistor connected in series with the unidirectional device.

3. The power subsystem of claim 2 wherein the unidirectional device includes a diode.

4. The power subsystem of claim 1 further including a circuit arrangement for sensing overcurrent coupled to the first switching device.

5. The power subsystem of claim 4 wherein the circuit arangement includes a series parallel combination of three resistors connected to an electrode of said switching means; and
    a zener diode interconnecting the gate of the switching device to the resistors.

6. The power subsystem of claim 1 wherein the control circuit arrangement includes a latch means which is set when the switching means is to be turned off and is reset when the switching means is to be turned on.

7. The power subsystem of claim 1 wherein the control circuit arrangement includes a latch means; said latch means having a first transistor having a base electrode, a collector electrode and an emitter electrode coupled to the gate electrode of the switching device;
    a second transistor having an emitter electrode, a collector electrode coupled to the base electrode of the first transistor and a base electrode coupled to the collector electrode of the first transistor;
    a storage means coupled to the base electrode of the second transistor;
    a first resistive means connected in parallel with the storage means; and
    a second resistive means interconnecting the emitter electrode of the first switching means with the base and collector electrodes of the first and second transistor, respectively.

8. The power subsystem of claim 1 wherein the first circuit arrangement is a diode coupled in series with a resistor.

9. The power supply of claim 1 wherein the second circuit arrangement includes an error amplifier means;
a capacitor coupled to the error amplifier means;
a first diode coupled in series with the capacitor; and
a second diode coupled in series with the first diode.

10. An improved display system comprising in combination:
a display subsystem having a high voltage transformer for providing anode voltages which drive said display; subsystem
a power circuit means including a power transformer and a power FET device coupled to the display subsystem;
a sync winding positioned on a core of said high voltage transformer, said sync winding generating sync pulses for activating the power FET device;
a drive/bias circuit means including a single winding coupled to the power transformer; said drive/bias circuit means generating a first signal for driving the FET device when it is in an ON state and a second signal for biasing the FET device when it is in an OFF state; and
a gate control circuit means interconnecting the sync winding with the power circuit means; said gate control circuit means including a latch means responsive to a first signal received from the sync winding to activate the power FET device and a second signal from the drive/bias circuit means to deactivate the power FET.

* * * * *